Feb. 9, 1960  C. P. GEEN  2,924,065
FILAMENT TWISTING APPARATUS
Filed Jan. 10, 1956  11 Sheets-Sheet 1
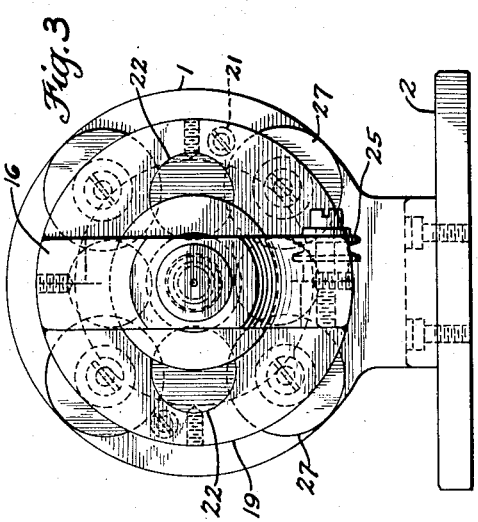
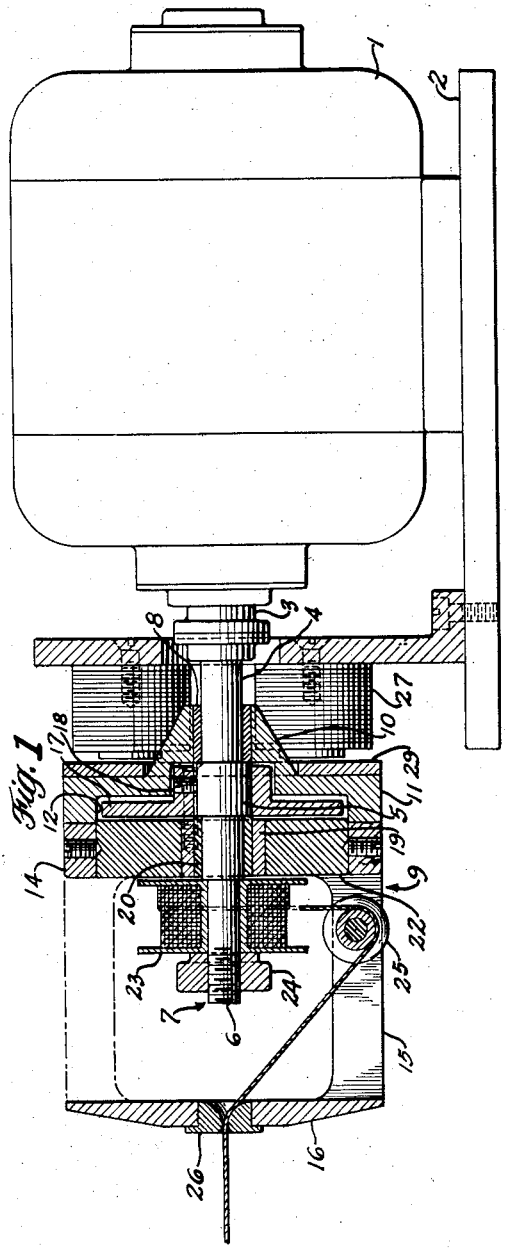
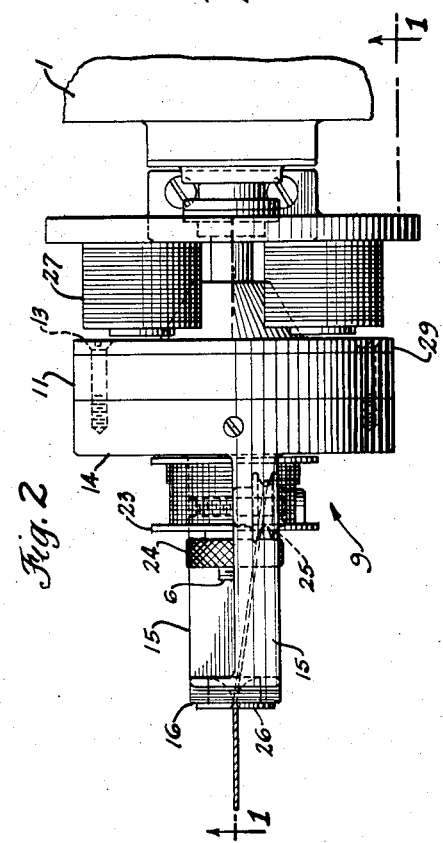
INVENTOR
CORY P. GEEN
BY
Oberlin & Limbach
ATTORNEYS Feb. 9, 1960
C. P. GEEN
2,924,065
FILAMENT TWISTING APPARATUS
Filed Jan. 10, 1956
11 Sheets-Sheet 2
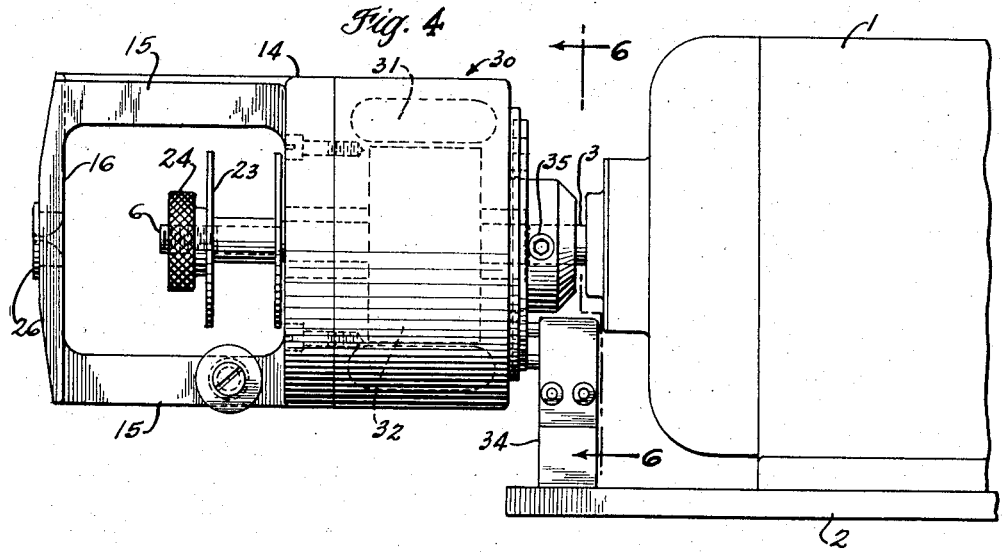
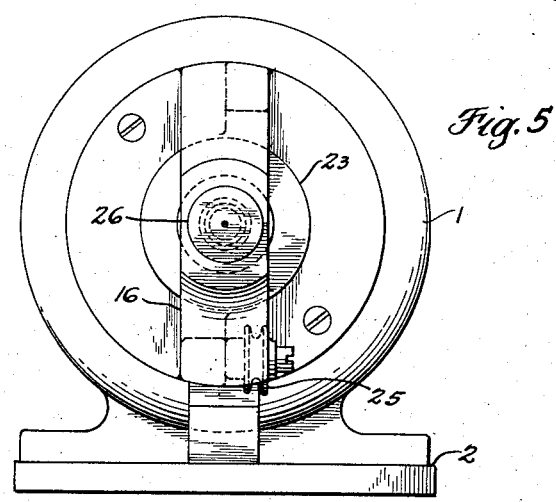
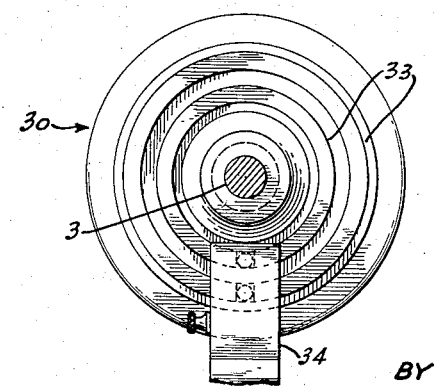
INVENTOR
CORY P. GEEN
BY
*Oberlin & Limbach*
ATTORNEYS Feb. 9, 1960 C. P. GEEN 2,924,065
FILAMENT TWISTING APPARATUS
Filed Jan. 10, 1956 11 Sheets-Sheet 3
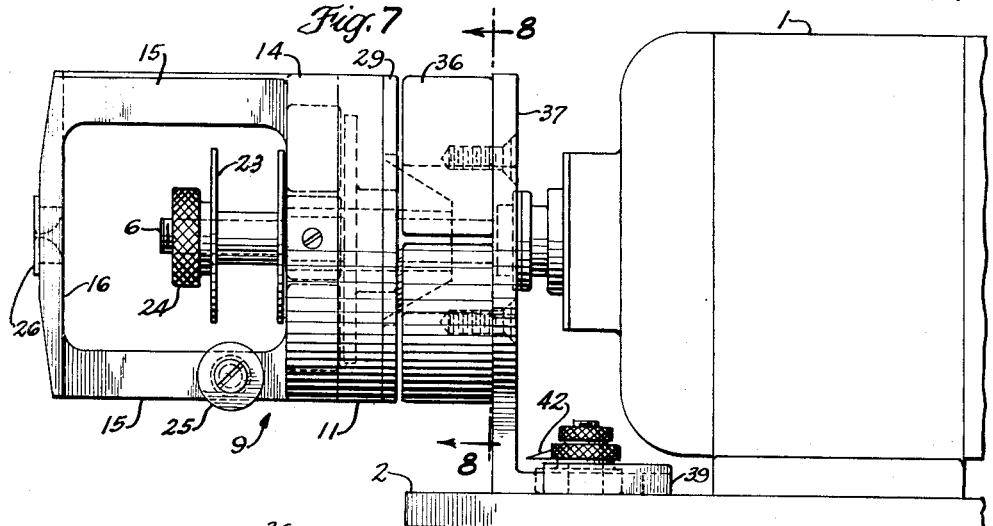
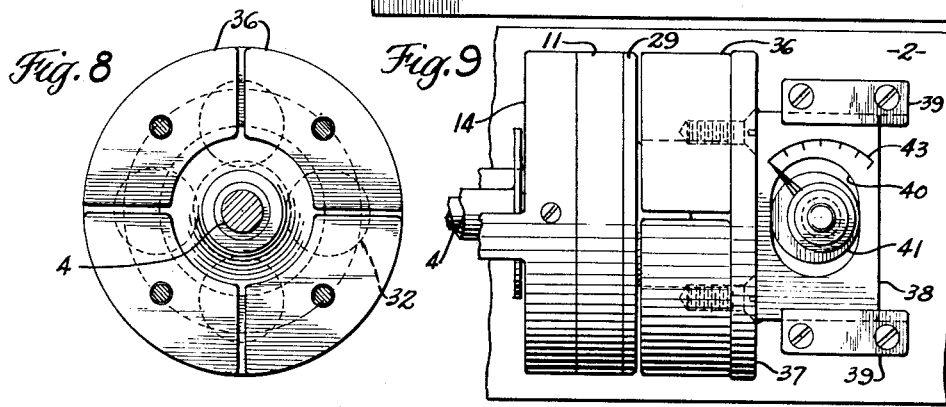
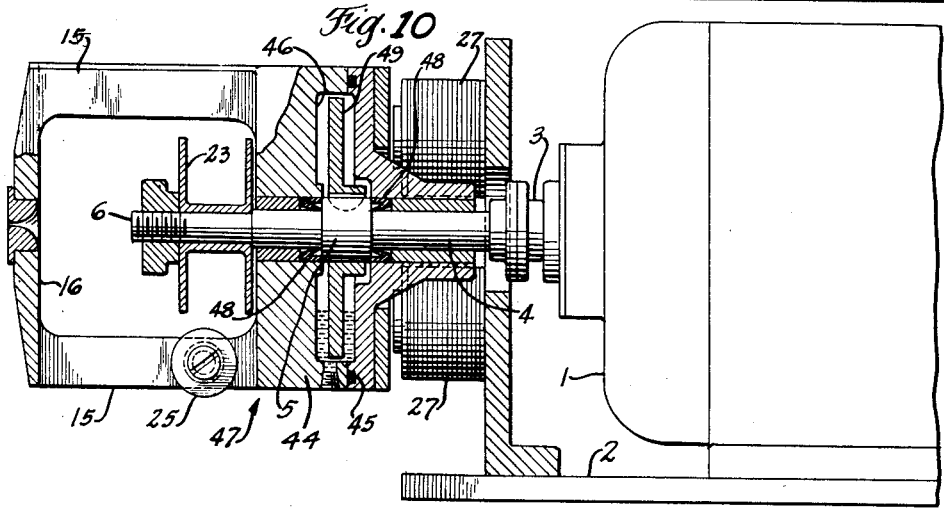
INVENTOR
CORY P. GEEN
BY Oberlin & Limbach
ATTORNEYS

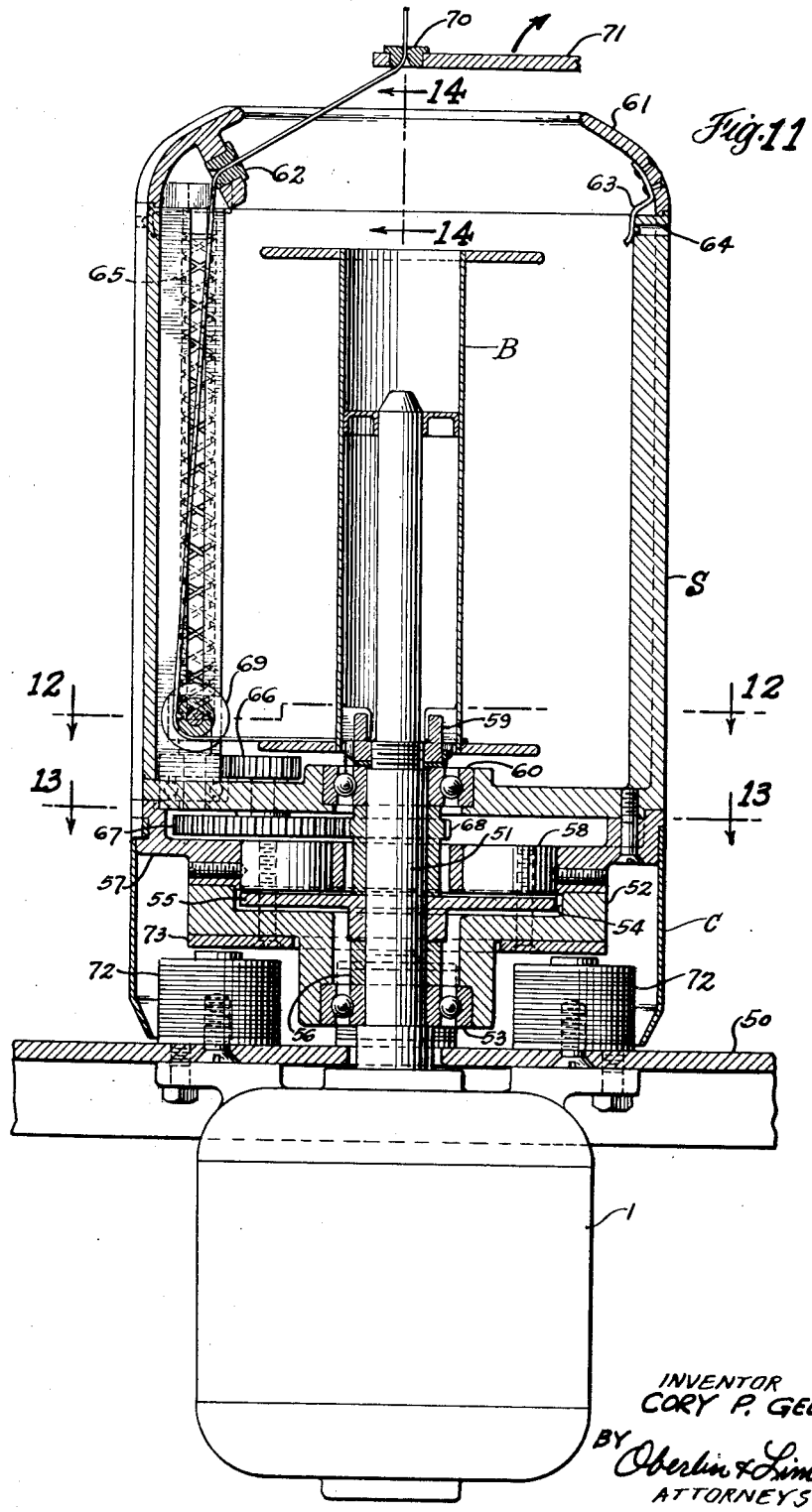

Feb. 9, 1960  C. P. GEEN  2,924,065
FILAMENT TWISTING APPARATUS
Filed Jan. 10, 1956  11 Sheets-Sheet 5

INVENTOR
CORY P. GEEN
BY
Oberlin & Limbach
ATTORNEYS

Feb. 9, 1960    C. P. GEEN    2,924,065
FILAMENT TWISTING APPARATUS
Filed Jan. 10, 1956    11 Sheets-Sheet 6

INVENTOR
CORY P. GEEN
BY
Oberlin & Limbach
ATTORNEYS

Feb. 9, 1960 C. P. GEEN 2,924,065
FILAMENT TWISTING APPARATUS
Filed Jan. 10, 1956 11 Sheets-Sheet 7

INVENTOR
CORY P. GEEN
BY Oberlin & Limbach
ATTORNEYS

Feb. 9, 1960
C. P. GEEN
2,924,065
FILAMENT TWISTING APPARATUS
Filed Jan. 10, 1956
11 Sheets-Sheet 8
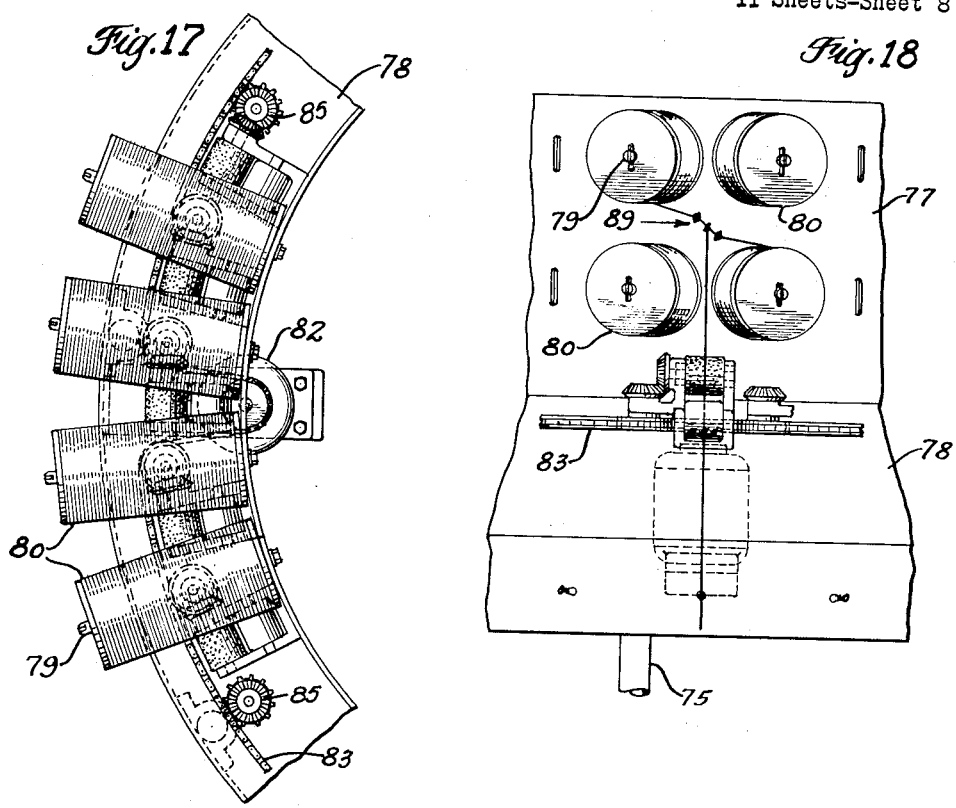
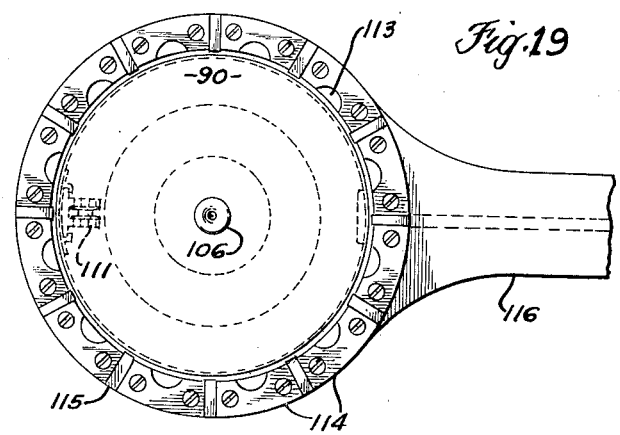
INVENTOR
CORY P. GEEN
BY Oberlin & Limbach
ATTORNEYS Feb. 9, 1960  C. P. GEEN  2,924,065
FILAMENT TWISTING APPARATUS
Filed Jan. 10, 1956  11 Sheets-Sheet 9
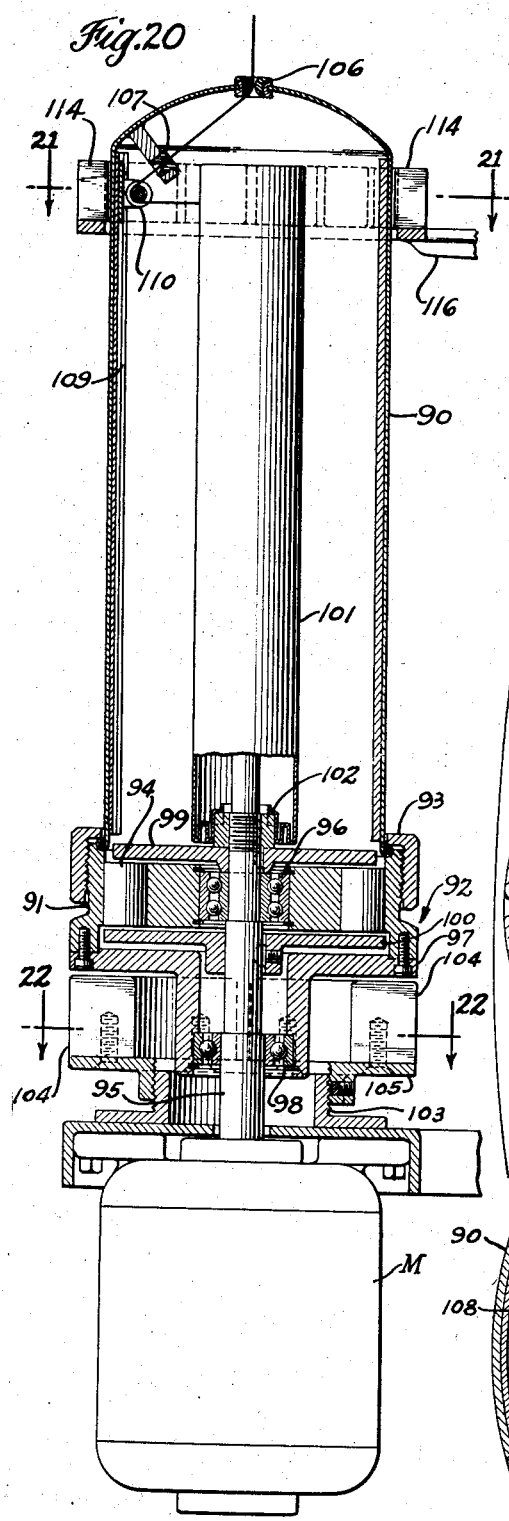
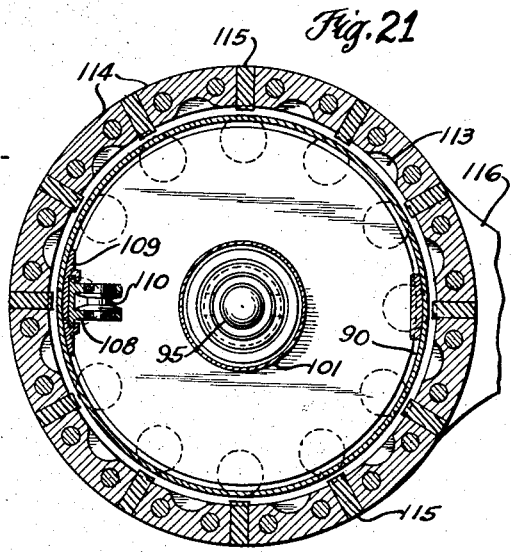
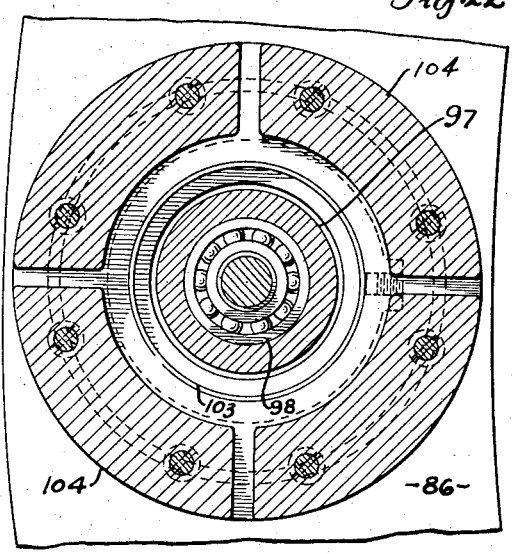
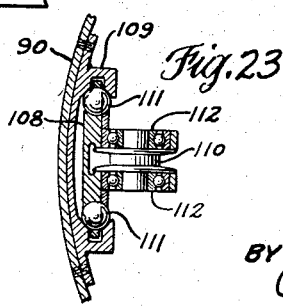
INVENTOR
CORY P. GEEN
BY Oberlin & Limbach
ATTORNEYS Feb. 9, 1960 C. P. GEEN 2,924,065
FILAMENT TWISTING APPARATUS
Filed Jan. 10, 1956 11 Sheets-Sheet 10

INVENTOR
CORY P. GEEN
BY Oberlin & Limbach
ATTORNEYS

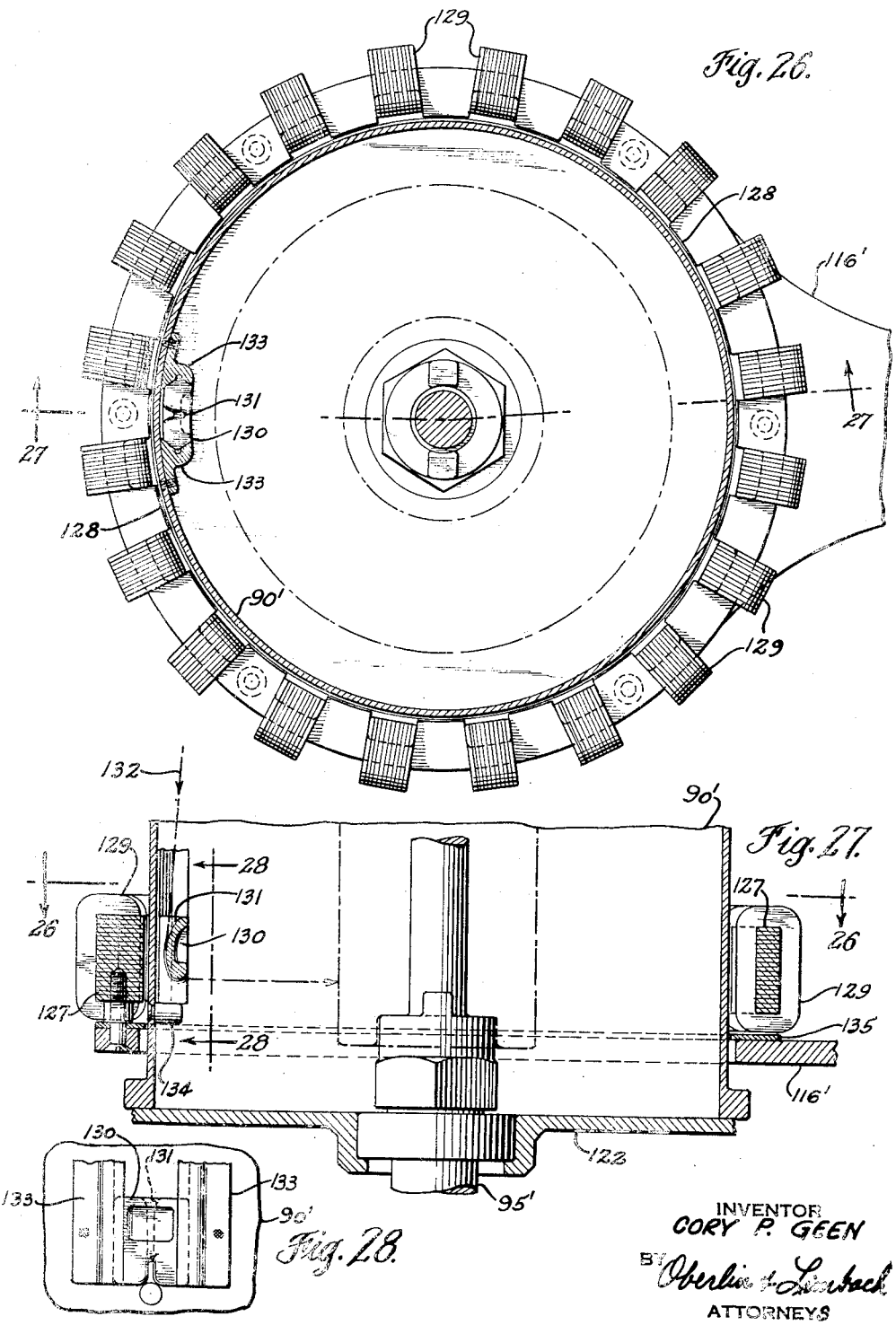

United States Patent Office 2,924,065
Patented Feb. 9, 1960

2,924,065

FILAMENT TWISTING APPARATUS

Cory P. Geen, Philadelphia, Pa.

Application January 10, 1956, Serial No. 558,330

13 Claims. (Cl. 57—67)

This invention relates to improved apparatus for imparting a controlled twist uniformly to textile fibers and other strand or filamentary material.

It is a primary object of my invention to provide means for such twisting at operating speeds considerably in excess of the working speeds heretofore possible in conventional apparatus, such as the widely used down or ring twister and the draw or up twister. As compared to the popular ring twister, which is inherently limited by the speed at which the traveler can move around the ring without burning out, my improved apparatus eliminates completely the lubricated twister ring and traveler with their yarn-soiling propensities, as well as such limitation on the speed of operation.

An up twister, on the other hand, requires a package of spun yarn to be placed on the spindle; it cannot take its feed from a creel or frame, and it cannot, without serious mechanical complications, twist together two or more plys and deliver them to the winder. It is an additional object of my invention to provide simple and improved means for twisting two or more plys at the same time. Another object is to provide such means which is not restricted to any particular type of yarn supply.

It is a further objective to provide such improved twisting apparatus in which a positive control of the twist is afforded.

In both types of the noted prior apparatus, and in variations of the two, the yarn or thread balloons over the end of the package, as it goes on the bobbin or receiver in the case of a down twister and as it comes off the bobbin to a winder in the case of an up twister. Since production machines comprise a plurality of spindles and the size of the balloons is determined in part by the speed of operation, such spindles require either to be quite widely spaced apart or operated at a reduced speed to avoid interference between adjacent balloons. Generally, a compromise must be effected for practical operation, notwithstanding the use of balloon separators which afford only limited benefits.

Another object of this invention is to provide a production twisting machine which is simpler and more economical than conventional twisting frames. An additional object is to provide such a machine which is characterized by extremely efficient utilization of space, that is, having high productive capacity per unit of floor space.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is an elevational view of a twisting device constructed and operative in accordance with the basic principles of the invention, part of the assembly being illustrated in section as viewed from the plane of the line 1—1 in Fig. 2;

Fig. 2 is a fragmentary top view of the device in the condition shown in Fig. 1;

Fig. 3 is a forward end view thereof;

Fig. 4 is an elevational view of a slightly modified twister assembly;

Fig. 5 is a forward end view of such modification;

Fig. 6 is a transverse sectional view taken on the plane of the line 6—6 in Fig. 4;

Fig. 7 illustrates a further modified form of the apparatus;

Fig. 8 is a section thereof as viewed from the plane of line 8—8 in Fig. 7;

Fig. 9 is a fragmentary top view illustrating an intermediate section of the Fig. 7 structure;

Fig. 10 is an elevational view partly in section of an additional modification;

Fig. 11 illustrates in longitudinal section a further twisting unit employing the same basic principles and including packaging building mechanism;

Fig. 17 is a fragmentary view showing in top plan and to an enlarged scale a portion of the upper or supply part of the machine;

Fig. 18 is an enlarged elevational view of the portion illustrated in Fig. 17;

Fig. 19 illustrates in plan one of the magnetic builder controls employed in the machine;

Fig. 20 is a longitudinal section of one of the twist units shown in the complete machine;

Fig. 21 is a transverse section of such unit as viewed from the plane of the line 21—21 in Fig. 20;

Fig. 22 is a further transverse section taken on the plane of the line 22—22 in Fig. 20;

Fig. 23 is a section taken through the particular package builder within the unit;

Fig. 26 is a transverse section on the line 26—26 of Fig. 27 showing a modified form of magnetic builder;

Fig. 27 is a vertical section on the line 27—27 in Fig. 26; and

Fig. 28 is a fragmentary view in elevation of the builder shoe employed in this assembly, the view being indicated by the line 28—28 in Fig. 27.

Figure 12:
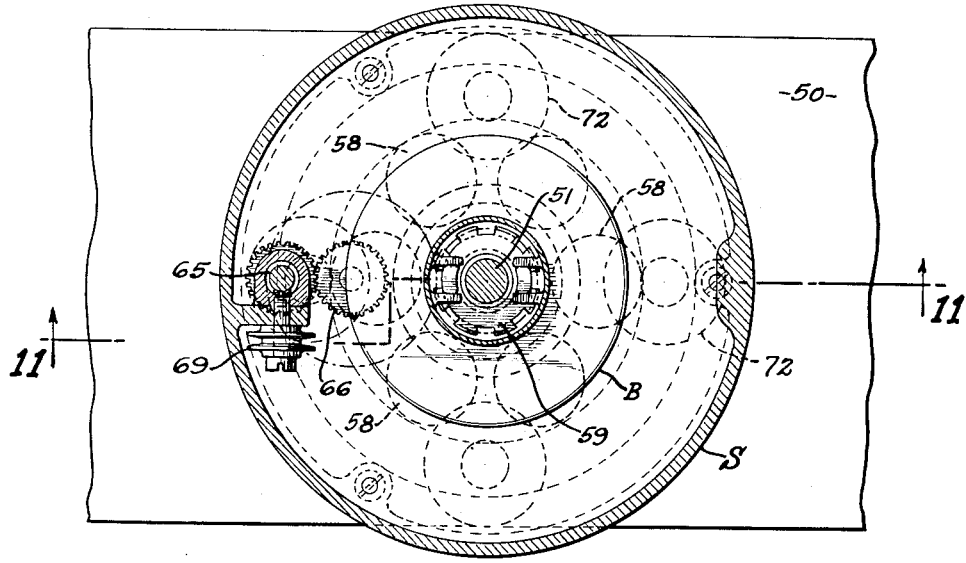
Fig. 12 is a transverse sectional view taken on the plane indicated by the line 12—12 in Figure 11.

Referring now to the drawings in detail, the device illustrated in Figs. 1 to 3 comprises a high speed electric motor 1 mounted on a suitable frame or base member 2. Secured to the output shaft 3 of the motor for rotation thereby is a spindle 4 having an enlarged intermediate portion 5 and a reduced outer end section 6, the latter being externally threaded as indicated at 7. A sleeve bearing 8 is disposed about the spindle to the rear of the enlarged portion, and mounted thereon is a twist head designated generally by reference numeral 9.

The twist head comprises a rear frusto-conical support portion 10 engaged with the mounting sleeve and a contiguous cap 11 defining an annular space 12 about the enlarged spindle portion. Secured by screws 13 to the forward end of such cap is a yoke 14 comprising generally diametrically opposed legs 15 and an outer or forward bridge portion 16 which is spaced an appreciable distance beyond the forward, free end of the spindle.

A drag disc 17 made of magnetic material is secured to the spindle at the enlarged portion of the same by means of a set screw 18 so as to rotate with the spindle in the space 12 formed by the cap. Outwardly of such disc a ring 19 is mounted on the spindle with a further sleeve bearing 20 interposed between the two just forwardly of the enlarged spindle portion. Such ring is fixed to the twist head assembly by means of set screws 21 and carries a number of permanent magnets 22 in circularly spaced-apart relation and arranged so as to alternate in polarity.

A spool or bobbin 23 for receiving the yarn or filament is removably secured to the outer end of the spindle, the same being abutted against the shoulder formed by the outer reduction in spindle diameter and held thereon by a knurled thumb nut 24 which is threaded on the spindle end. The thus mounted spool is within the area defined by the yoke arms upon revolution of the twist head. A twist roller 25 is mounted for rotation on one yoke arm with its axis at right angles to such arm and a nose guide 26 of suitable wearing material is supported centrally of the bridge portion of the yoke and hence axially of the spindle. The yarn is led from the source of supply through the nose guide, about the tiwst roller and then to the spool.

It will be apparent that the spool and drag disc are driven positively by the high speed motor, while the twist head is free to rotate on the spindle. Due to the magnetic attraction between the drag disc and the permanent magnets carried by the head, a magnetic coupling results which assists in causing the head to rotate with the driven spindle. This action supplements the pull on the head as a result of winding of the yarn and is especially beneficial in overcoming the starting inertia of the head and in the twisting of relatively light yarns.

As the spool is driven by the spindle, the yarn will be taken on and twisted in the process. Because the yoke is rotating in the same direction as the motor driven spool but at a different rate of speed, the twist created by the crank-like path of the yarn through the nose guide and around the twist roller is controllable. That is, the number of turns per inch may be varied by regulation of the speed of the yoke relative to the spool. In the Fig. 1 assembly, such control is provided in the form of a magnetic retarding or braking of the twist head in an adjustable manner.

The structure employed for the purpose comprises a number of electro-magnets 27 mounted on an apertured plate secured to the base of the device and arranged in circularly spaced relation closely adjacent the rear end of the twist head 9, the spindle and the coupling of the same to the motor drive shaft extending through the opening of such plate. The twist head proper is preferably made of non-magnetic and lightweight material, such as aluminum, and an iron ring 29 is secured at the rear of the cap body 11 so as to be proximate to and hence influenced by the electro-magnets. Energization of the latter induces eddy currents in the ring and thus magnetically couples the head to the stationary support. By varying the current to the electro-magnets, and consequently the strength of the induced eddy currents, the degree of control of rotation of the twist head is modified.

It is to be noted that both the drive of the head and the control of its speed of rotation are accomplished without physical contact of parts. Accordingly, the number of wearing parts in the device is kept to a practical minimum, thereby to increase the productive life of the assembly and permit very high speeds.

In the twister illustrated in Figs. 4 to 6, and in which parts similar to those previously described have been assigned respectively the same reference numerals, control of the speeds of rotation of the twist head and the bobbin in relation to one another is achieved by different means. Such construction includes a second high speed electric motor, indicated generally at 30, mounted at the rear of the twist head and comprising conventional field and armature sections 31 and 32 respectively. The head motor includes circular slip rings 33 exposed at the rear for energization of the motor cooperably with stationary brushes engaged with the rings and mounted on a pedestal 34.

In this form of the twister, the large driving motor 1 rotates the small electric motor 30 in the head, with the drive motor shaft ending just beyond the set screw 35 and the rest of the shaft and motor 30 with the bobbin being entirely separate. The revolving motor 30 is supplied with electric current through the brushes and slip rings, and as the yoke 14 and its motor revolve in the same direction as the bobbin, but at a different and controllable rate, the method of operation is the same as previously set forth.

The twisting assembly shown in Figs. 7 to 9 is similar to the Fig. 1 construction with respect to the arrangement and drive of the bobbin and twist head, but differs in the means employed for the variable braking action. In lieu of the described electro-magnets, such modification employs a plurality of permanent magnets 36 likewise arranged to provide magnetic coupling with the ring 29 secured to the end of the twist head 9. The desired regulation of the retarding effect is afforded by mounting the upright magnet support plate 37 for movement toward and away from the twist head, the plate having a right angle lower slide portion 38 which is reciprocable within ways 39 secured to the base. The slide portion preferably is formed with a slot 40 within which an eccentric 41 is disposed and operative upon rotation to cam the slide back and forth. A pointer 42 secured to the eccentric and a suitably marked scale 43 on the slide are provided to indicate various settings of adjustment. Once again the construction provides control of the rotational speed of the twist head without additional wearing parts other than the bearings, and is silent in operation.

In the modification illustrated in Fig. 10, a slightly different slip or drag drive arrangement is employed between the motor driven spindle and the twist head. The rear of the yoke portion 44 is here joined to the end cap with an "O" ring seal 45 therebetween and is formed interiorly with a recess 46 which cooperates to form a greater annular space within the twist head 47 and about the enlarged spindle portion 5. Low friction seals 48 made of suitable synthetic material are employed at the ends of the enlarged spindle portion, which coincide with the respective sides of the opening, and a drag disc 49 is keyed to such spindle portion for rotation in the thus formed inner opening of the head. A suitable fluid, preferably one of the constant viscosity types such as a silicone fluid, is supplied to the opening to create the desired drag on the twist head. As in the case of the permanent magnets within the head, this drag is provided to start the head in motion and afford a related speed between the yoke and the bobbin which will at all times keep the yarn taut between the twist roller and the bobbin without breaking it.

Figure 13:
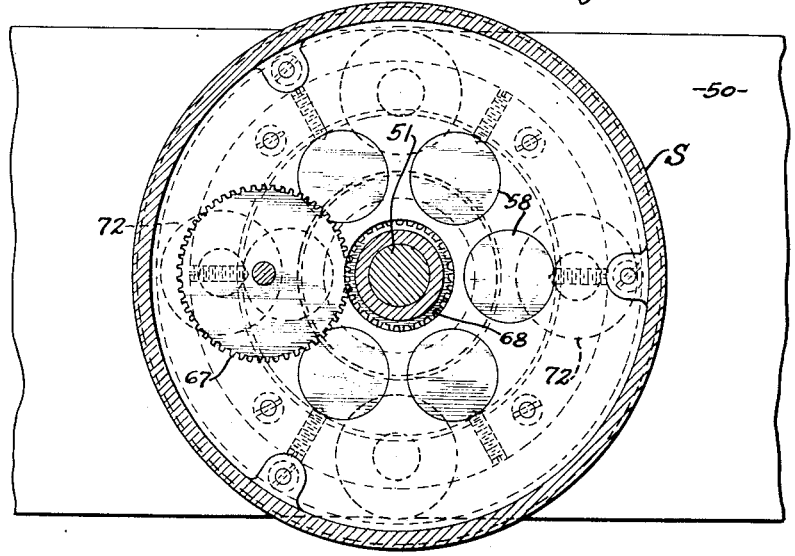
Fig. 13 is a like sectional view on the plane indicated by the line 13—13 in Fig. 11.
Figure 14:
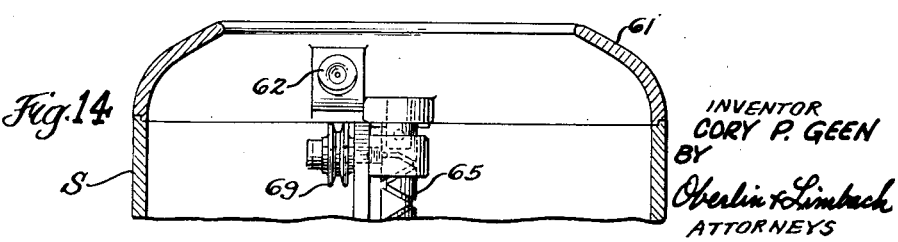
Fig. 14 illustrates in section a further portion of the Fig. 11 construction, the plane of the section being indicated by the line 14—14.

Another modified form of my improved twisting device, one which is particularly suited to the handling of small packages, is illustrated in Figs. 11 through 14. Such unit again comprises a high speed electric motor 1 which is supported vertically by a structural frame member or mounting rail 50, and a spindle assembly 51 extending vertically upwardly above the rail is driven thereby. An aluminum body 52 is mounted on the spindle adjacent the rear end of the same, with a ball bearing 53 between the two, such body having a recess 54 within which an iron drag disc 55 secured to the spindle is disposed for rotation with the latter. A spacer sleeve 56 between the ball bearing and the hub portion of the drag disc positions the disc in such opening. A carrier 57 is attached to the upper end of the body 52 and supports a number of permanent magnets 58 as in the first described form of the invention. A conventional flanged type of bobbin B is mounted on the spindle and held in place by the usual combined lock nut and bobbin driving dog 59. A cylindrical dust cover C secured to and extending downwardly from the carrier encases the lower portion of the assembly, while a cylindrical shroud S is similarly secured to project upwardly from the carrier.

The shroud has an annular base which is engaged about a further ball bearing 60 on the spindle to support the twist head for rotation cooperably with ball bearing 53. At its upper end, the shroud is provided with a removable cap 61 having a central opening of a size such to permit passage of the bobbin for doffing, and a yarn guide 62 is fixed to the cap to deflect or displace the incoming yarn to one side of the spindle axis. Small spring latches 63 normally hold the cap on the shroud and may be released by the insertion of a tool through adjacent openings 64 in the shroud wall when it is desired to remove the cap.

This construction includes builder mechanism comprising a double-threaded screw 65 which is supported vertically along the shroud wall and driven by gears 66, 67, and 68, the last of which is secured to the spindle for rotation with the same. The twist roller unit 69 is threadably engaged with the builder screw, whereby turning of the latter causes the roller to move up and down parallel to the bobbin axis for the desired building. An axial yarn guide 70 is mounted above the shroud cap opening on a pivoted member 71 which may be moved either vertically as indicated by the arrow or horizontally to provide access for doffing of the bobbin. The yarn is led axially through the guide 70 into the shroud, through guide 62, and around the twist roller to the bobbin. Electro-magnets 72 secured to the mounting rail and an iron ring or washer 73 attached to the end of the twist head cap provide the controllable braking by magnetic coupling as set forth earlier.

Figure 15:
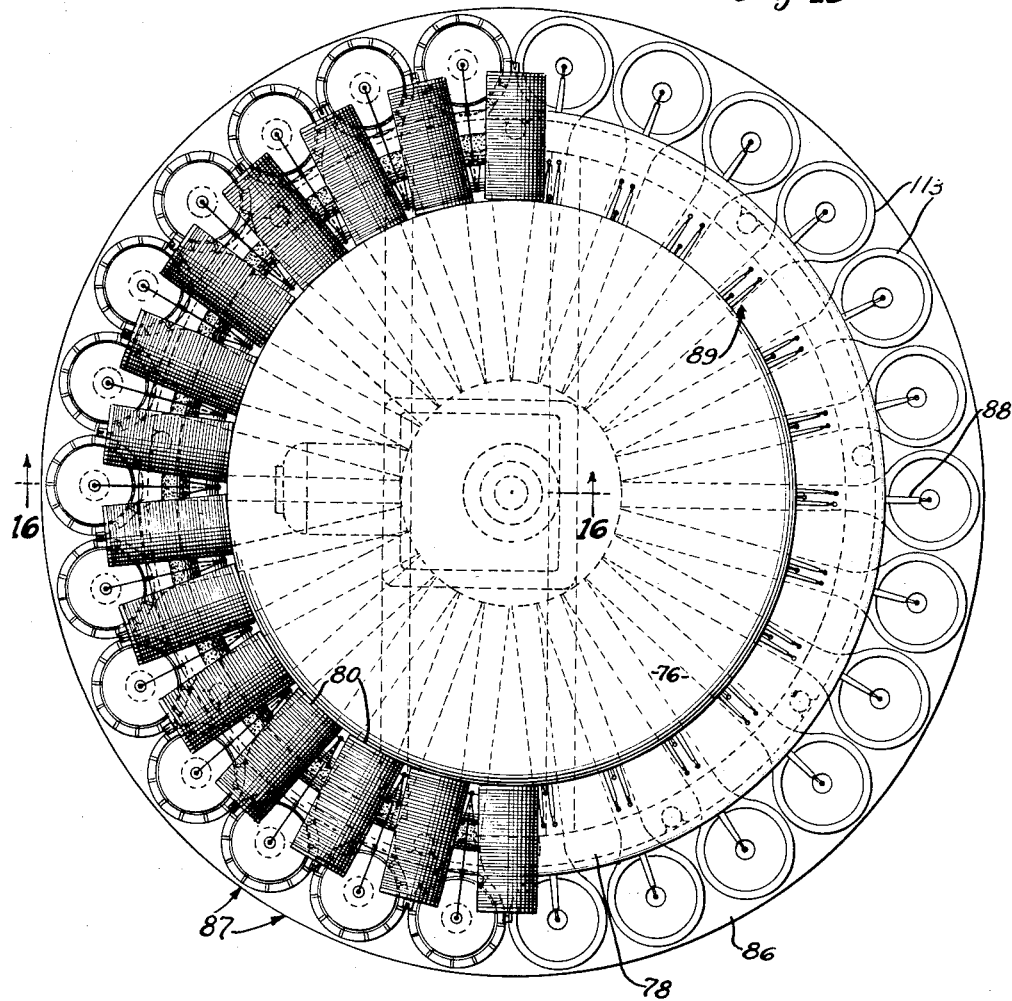
Fig. 15 is a top plan view of an improved machine comprising a plurality of my new twist units.
Figure 16:
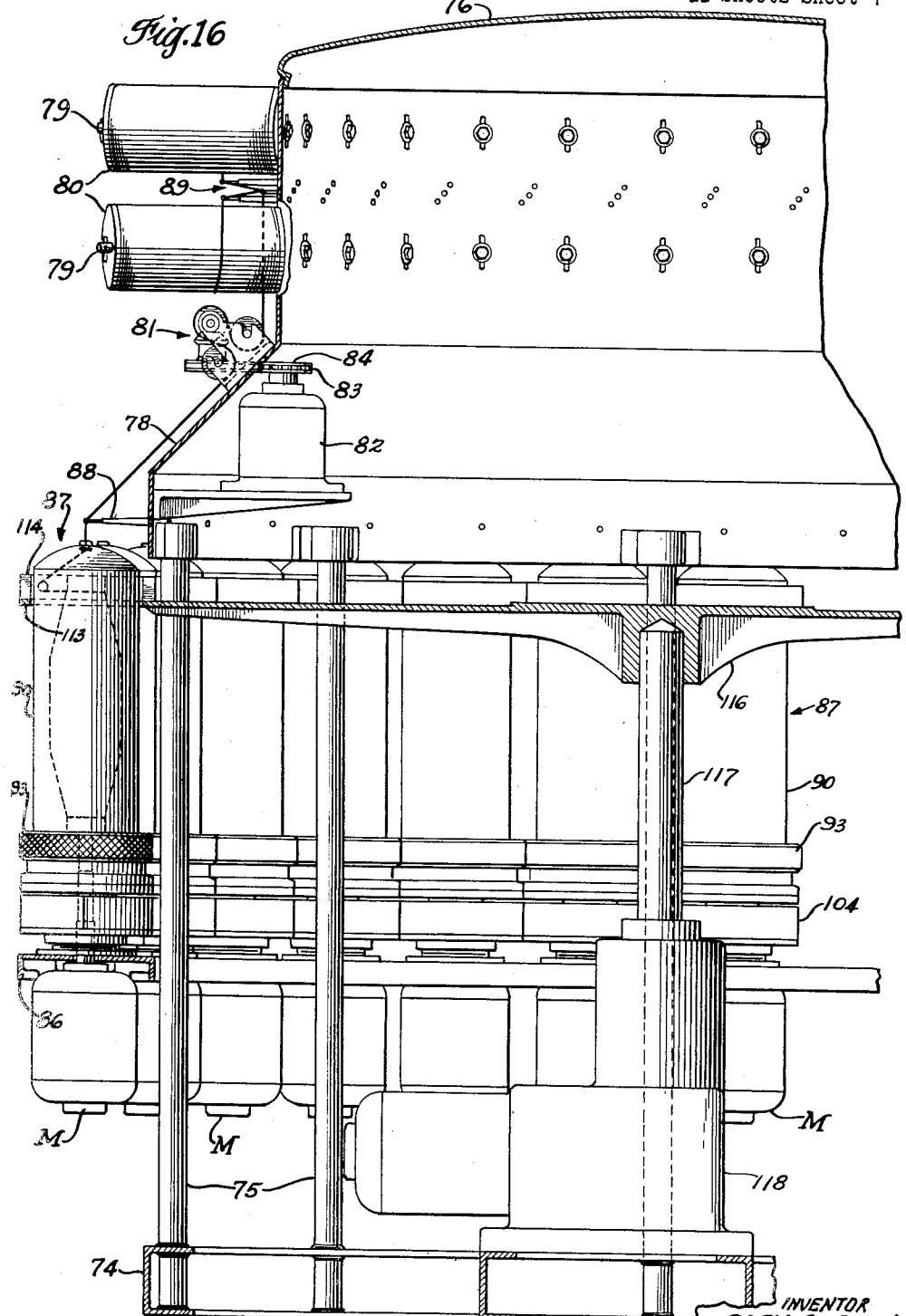
Fig. 16 illustrates a radial section of the machine as indicated by the line 16—16 in Fig. 15.

All of the twisting devices described in the foregoing are characterized by positive guiding and containment of the yarn in its approach to the bobbin and thus distinguish in this respect from all forms of conventional twisters wherein the yarn or thread is ballooned. By virtue of this elimination of the ballooning action, it is possible to construct a machine, incorporating a considerable number of my improved units, of entirely different, simpler, and less expensive nature, and thereby effect additional advantages with respect both to equipment cost and productivity. In Figs. 15 through 19, I have illustrated such a machine, which it will be noted is of circular design.

The machine comprises a base frame 74 from which a number of tubular support columns 75 extend upwardly in circularly spaced apart relation. A turret 76 is supported on the upper ends of such columns, the turret having an upper cylindrical supply portion indicated at 77 and an outwardly flared skirt portion 78 therebelow. Circumferently spaced about the upper supply portion I provide a number of supports 79 adapted to receive and hold supply packages 80, the supports in the particular embodiment shown being arranged to support the packages substantially horizontally in two superimposed circles. Other supply arrangements may obviously be used depending on the work the machine is to do. Feed roll assemblies 81 are supported on the turret skirt 78 and driven by means of a motor 82 housed within the turret, such drive being effected by a chain 83 about output gear 84 of the motor and extending about the turret to engage the individual roll assembly drive gears 85 at the several locations of the same.

A mounting ring 86 surounding the several tubular supports 75 serves to mount twisting units designated generally by reference numeral 87 in closely spaced relation with each including a high speed electric drive motor M. The yarn emerging at each feed roll assembly is directed downwardly through a guide 88 preferably pivotally secured to the turret and into the respectively associated twister. Three additional yarn guides, in an assembly designated at 89, are provided for each unit between the rows of the supply packages. As shown in Fig. 18, yarns taken from different packages may be merged in the guides 89 into a single multiple ply yarn for passage through the adjacent feed assembly and subsequent twisting.

The particular twisting device incorporated in this machine is shown more in detail in Figs. 20 and 23 and is generally similar to the various forms described above. Such device is designed for the building of relatively large packages and comprises a shroud 90 which is closed at its upper end and secured to the magnet carrier 91 of the twist head 92 by means of a knurled retaining nut 93. The carrier supports a number of permanent magnets 94 and is mounted for rotation on the spindle 95 by means of a ball bearing 96. At its rear end, the carrier has attached thereto an iron cap 97 supported by another ball bearing 98 on the spindle, and in this structure, two drag discs 99 and 100 are keyed or otherwise secured to the spindle respectively above and below the magnet carrier.

The bobbin 101 is secured to the spindle plate by a combination lock nut and drive dog member 102 and, as in the earlier discussed forms, the permanent magnets and drag discs act to couple the spindle and the shroud. A threaded sleeve 103 secured to the mounting ring or rail 86 supports braking permanent magnets 104 adjacent the iron cap 97, for the retarding effect utilized in control of the relative speed of the shroud, the magnet support 105 being movable toward and away from the twist head by threading of the same on the support sleeve.

The top of the shroud 90 is perforated and supports a nose or axial guide 106 for the yarn, and an additional guide 107 projects inwardly at one side for displacing the yarn radially with respect to the unit axis. The builder mechanism here comprises an iron shoe 108 mounted to move freely along a track 109 extending along the shroud wall and carrying a twist roller 110. Balls 111 are interposed between the shoe and track, to reduce friction, while ball bearings 112 are employed to mount the roller on the shoe. Control of the movement of the shoe with its twist roller is afforded by a movable ring 113 surrounding the shroud and supporting a number of magnets 114, the latter being separated by nylon spacers 115. Up and down traverse of the ring and the closely following shoe inside the shroud govern the form or shape of the package which is built. Ring 113 is fitted in the end of a control arm 116 of a spider mounted beneath the turret on a piston extension 117 of a motorized hydraulic unit 118 operative to reciprocate the piston. The several rings or assemblies of builder control magnets, each mounted in its arm of the spider and each surrounding the shroud of a twist unit move up and down in unison and control the package building by reason of their magnetic control over the shoes and rollers inside said units, as previously mentioned.

Figure 24:
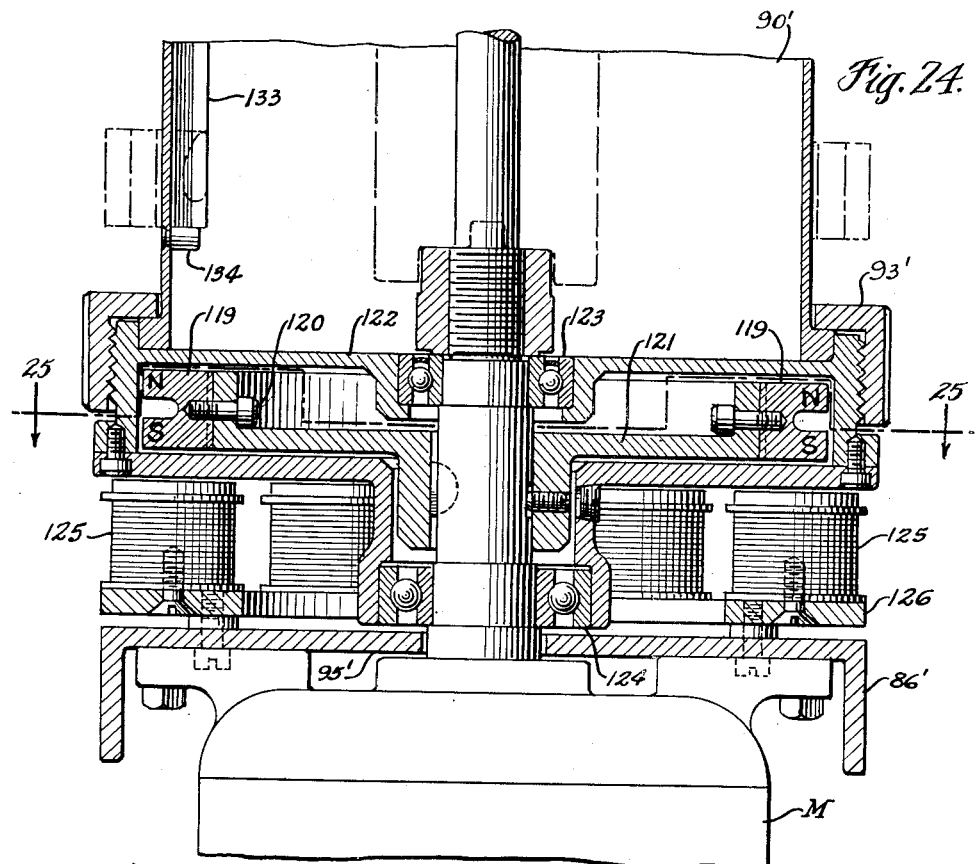
Fig. 24 illustrates another modification especially suited for large units, the structure being fragmented and shown as a vertical section on the line 24—24 in Fig. 25.
Figure 25:
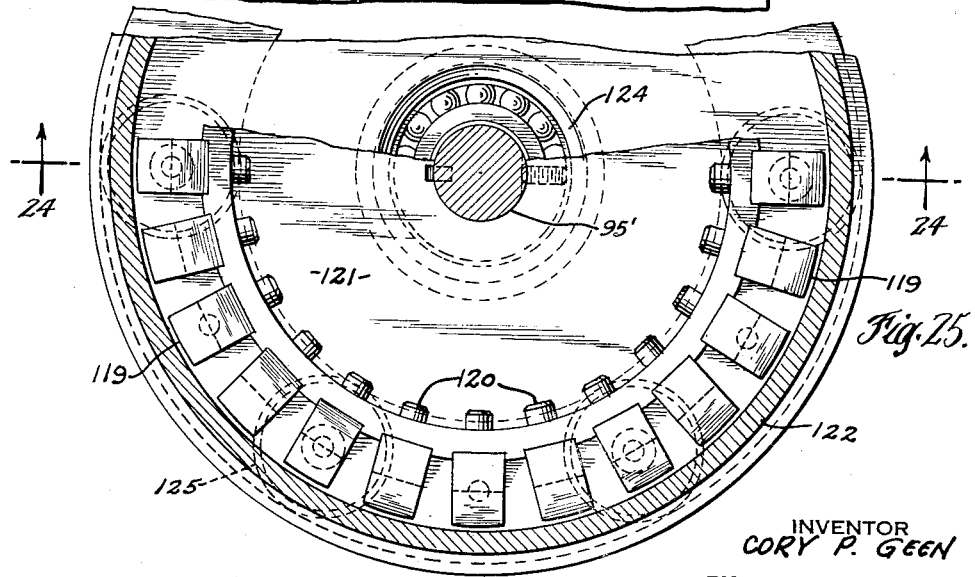
Fig. 25 is a fragmentary transverse section on the line 25—25 in Fig. 24.

The modification illustrated in Figs. 24 to 28 functions basically in the same manner as the unit just described and is particularly suited for large packages. Horseshoe magnets 119 are used in place of the circular slugs previously described, such magnets being secured by screws 120 to an aluminum magnet carrier 121 which is keyed to the spindle 95' for rotation therewith. An iron housing 122 surrounds the magnet carrier and is mounted for rotation on the spindle by ball bearings 123 and 124 respectively at the upper and lower sides of such housing.

In this construction, the horseshoe magnets are all assembled with their north poles at the top to form, in effect, a complete ring magnet with lines of force flowing from North to South through the cup-like housing in which they are enclosed, thereby providing a very powerful drive. The controlled braking is here provided by a number of electro-magnets 125 mounted in spaced relation about a support ring 126 on the machine mounting ring 86', the drive motor M being secured to the underside of the latter. It will be appreciated that the braking may alternatively be accomplished by the use of permanent magnets as described earlier.

Figs. 26 to 28 illustrate an electro-magnetic builder assembly which provides a more powerful control over the builder shoe on the inside of the shroud 90'. The same comprises a laminated ring 127 attached to the spider control arm 116 and having inner projecting portions 128 which define pole pieces surrounding the shroud. Between such pieces coils 129 are wound and connected in series-parallel arrangement so as to produce similar polarity between each pair; that is, the poles alternate in polarity completely around the ring. The wires (not shown) for such coils are carried along the arm of the spider in which the ring is mounted to a pair of collector strips on the hydraulic mechanism at the center of the circular machine. All the magnetic rings of the machine are thus fed by a simple and simultaneous means.

Because the ring is laminated, a very desirable feature for an electrical standpoint, the laminations may interlace between poles as in a Gramme Ring type dynamo. That is, the laminations need not be continuous rings but rather T-shaped segments, so that preformed coils may be slipped in place, the ring assembled and riveted from top to bottom through the laminations. Alternatively, the ring may be stamped from the usual armature lamination iron stock as continuous rings and the coils wound in place.

In this modification, I have also shown another form of builder shoe 130 which is preferably made of powdered alloy iron and has a bell-mouthed angular passage 131 for the yarn. The path of the yarn is indicated by the dashed line 132 in Fig. 27.

The shoe 130 is movable for the desired traverse along guides or ways 133 attached to the inner surface of the shroud and it will be clear that reciprocation of the spider control arm and the electro-magnetic builder control ring causes the shoe to follow such motion closely. This particular shoe has the advantage of reducing the inward projection of the builder assembly within the shroud and thereby cuts down the overall diameter of the unit. Furthermore, the extreme lightness of the shoe cuts down the centrifugal force at high speed and reduces the amount or extent of magnetic pull required to move it up and down in the track.

A stop pin 134 is provided at the bottom of the track to retain the shoe within the same. It is also preferable to provide a continuous nylon ring 135 beneath the coil assembly to serve as a "rub ring" in the event of vibration from a bad package, in the same manner as the rub strips 115 in the Fig. 21 construction.

As stated earlier, the twister device of my invention provides operating speeds substantially greater than have heretofore been practical, and when incorporated in number in the machine such as described, a much more efficient utilization of space is realized. Twisters made and thus free of the usual speed limiting factors noted at the outset have been operated successfully at 20,000 r.p.m. With respect to space utilization, it will be obvious that the circular machine herein disclosed, and made practicable by the elimination of ballooning in the new twisters, affords greater productive capacity per unit of required floor space than conventional elongated twisting frames. Moreover, the circular machine is more stable to level, and, because lighter, does not require special building floors and supports.

The structures described also provide means for "untwisting" high twist yarn which has been heat set and is then to be slightly "untwisted" to obtain a springy effect as in Helenca yarn. This is accomplished by reversing the rotation of the units without any mechanical changes and taking up the yarn by means of a suitable high speed winder, the operation being considerably less expensive than the methods now employed for such processing after heat treatment. In addition to reversing rotation of the units, it is required only to slip out the magnet assembly around each shroud and turn off the hydraulic rise and fall mechanism so that the sliding shoe and twist roll assembly inside each shroud follow the yarn as it comes off the bobbin.

Various modifications and requirements not specifically mentioned herein will undoubtedly suggest themselves to workers in the art without, however, departing from the basic ideas and principles I have disclosed. It may be noted that the direct drive of the several twisters may be by hydraulic means, such as disclosed in my Patent No. 2,663,541, dated December 22 1953, rather than the high speed electric motors discussed, while still retaining the advantage of eliminating drive tapes which present a further source of breakdown. The builder control magnet assemblies can be in the form of centrally split or hinged rings to enable the operator to remove the shrouds more readily. In lieu of the roller carried by the builder shoe, the same could be formed with a substantially right angle passageway for the yarn.

Other modes of applying the principle of the invention may be employed, change being made as regards the details described, provided the features stated in any of the following claims, or the equivalent of such, be employed.

I therefore particularly point out and distinctly claim as my invention:

1. In a filament twisting device wherein the filament to be twisted is fed substantially axially toward a rotating receiver, the combination of a spindle, on the forward end of which, said rotatable receiver may be removably secured, drive means adjacent the rear end of said spindle and connected directly therewith for positive drive of the same, filament guiding means, supporting means for said filament guiding means guiding the latter for rotation concentrically with said spindle in a plane intersecting the area normally occupied by said receiver and which is at substantially right angles to the axis of said spindle, the filament being deflected from its axial path forward of the spindle directly laterally to said filament guiding means and extending from the latter to the receiver, and means positioned rearwardly of the space normally occupied by said receiver for rotatably mounting said supporting means, said filament guiding means being so mounted on such supporting means as to preclude relative rotation of the two.

2. A twister assembly comprising a rotating spindle, a twist head freely rotatable about the spindle and carrying filament guiding means, a magnetizable member secured to the spindle for rotation therewith, and permanent magnet means carried by said twist head in proximately spaced relation to such rotating member, thereby magnetically to couple the two for torque transmission therebetween.

3. A twister assembly comprising a rotating spindle, a twist head freely rotatable about the spindle axis and carrying filament guiding means, said filament guiding means being so mounted on the twist head as to preclude relative rotation of the two, a magnetizable member secured to said twist head for rotation therewith, and fixed electromagnetic means operative to establish a magnetic field acting upon said member to retard rotation of the same.

4. A twister assembly comprising a rotating spindle, a twist head freely rotatable about the spindle axis and carrying filament guiding means, a magnetizable member secured to said twist head for rotation therewith, non-rotating permanent magnet braking means adjacent said member, and means mounting said permanent magnet means for movement to vary the spacing of the same from the member and hence the braking effect on rotation of the twist head.

5. A filament twisting device comprising a spindle adapted to have a filament receiver removably secured thereto, spindle drive means, a cylindrical cover disposed to surround the space normally occupied by the receiver on the spindle, means supporting said cover freely for rotation, magnetizable filament guiding means mounted on the inner wall of said cover for reciprocation parallel to the spindle axis, means adjacent the cover for establishing a magnetic field effective to influence said filament guiding means, and means for moving such magnetic field to reciprocate the filament guiding means.

6. Filament twisting apparatus comprising a plurality of individual twisting devices mounted in circularly spaced-apart relation, each such device including a spindle adapted to have a filament receiver removably secured thereto and spindle drive means, a turret supported centrally of the thus arranged devices, feed roll assemblies mounted on the turret respectively in association with the twisting devices, filament guiding means for directing the filaments fed by said roll assemblies axially toward the twisting devices, further guiding means associated with each spindle guided for rotation concentrically therewith in a plane intersecting the area normally occupied by the receiver and which is at substantially right angles to the spindle axis, and means to the rear of the receiver spaces for rotatably mounting the further filament guiding means on anti-friction bearings.

7. Filament twisting apparatus comprising a plurality of individual twisting devices arranged and supported in circularly spaced-apart relation, each such device including a driven spindle adapted to mount a filament receiver for rotation therewith and a cylindrical shroud enclosing the space normally occupied by the thus mounted receiver, feed roll assemblies respectively associated with and supported adjacent said twisting devices, filament guiding means for directing the filaments supplied by the roll assemblies axially toward the twisting devices, and further filament guiding means carried by each such shroud within the same for radially displacing the filament supplied thereto, the shrouds being mounted freely for rotation relative to the support of the twisting devices by anti-friction means.

8. Filament twisting apparatus comprising an annular frame member, a plurality of encased twisting devices supported in circularly spaced-apart relation by said frame member, a high speed drive unit associated with each such device, a turret supported centrally of the thus arranged twisting devices, feed roll assemblies supported on said turret for supplying filaments to the several devices, a magnetizable builder in each device, magnetic field producing means disposed about each device to influence such builder therein, and common actuating means for reciprocating the magnetic field producing means to impart traversing motion to the builders.

9. In a filament twisting device wherein the filament to be twisted is fed substantially axially toward a rotating receiver, the combination of a spindle, on the forward end of which, said rotatable receiver may be removably secured, high speed drive means adjacent the rear end of said spindle and connected directly therewith for positive driving of the same, filament guiding means, supporting means for said filament guiding means guiding the latter for rotation concentrically with said spindle in a plane intersecting the area normally occupied by said receiver and substantially at right angles to the axis of the spindle, said filament guiding means being so mounted on such supporting means as to preclude relative rotation of the two, means positioned rearwardly of the space normally occupied by said receiver for rotatably mounting said supporting means, and means for variably braking rotation of said filament supporting means by magnetic coupling thereof to establish a predetermined speed of rotation of the same in relation to the speed of rotation of said receiver.

10. In filament twisting apparatus, a spindle adapted to have a receiver removably secured thereto, high speed drive means having a positive mechanical connection with said spindle, filament guiding means, supporting means mounting said guiding means freely for rotation about the spindle, and means magnetically coupling said spindle and said supporting means.

11. In filament twisting apparatus, a spindle adapted to have a receiver removably secured thereto, high speed drive means having a positive mechanical connection with said spindle, filament guiding means, supporting means mounting said filament guiding means freely for rotation about the spindle, said filament guiding means being so mounted on such supporting means as to preclude relative rotation of the two, stationary structure adjacent said supporting means, and means for adjustably magnetically coupling said supporting means and stationary structure for variably braking the rotation of the former, thereby to maintain a predetermined relationship of the speeds of rotation of the receiver and filament guiding means.

12. In a filament twisting device wherein the filament to be twisted is fed substantially axially toward a rotating receiver, the combination of a spindle, on the forward end of which, said rotatable receiver may be removably secured, high speed drive means connected to the rear end of the spindle, filament guiding means, supporting means for said filament guiding means guiding the latter for rotation concentrically with said spindle in a plane intersecting the area normally occupied by said receiver and substantially at right angles to the axis of the spindle, means positioned rearwardly of the space normally occupied by said receiver for rotatably mounting said supporting means on anti-friction bearings, and means magnetically coupling said spindle and said filament guiding means.

13. A filament twisting device comprising a spindle adapted to have a filament receiver removably secured thereto, means for driving said spindle, a guide support extending substantially parallel to the spindle in outwardly spaced relation, a magnetizable filament guide reciprocable on said support along such extent thereof, means for establishing a magnetic field about said guide, and means for moving such magnetic field producing means to reciprocate the filament guide.

References Cited in the file of this patent

UNITED STATES PATENTS

| | | |
|---|---|---|
| 2,142,111 | Camp | Jan. 3, 1939 |
| 2,575,476 | Truitt | Nov. 20, 1951 |
| 2,654,210 | Bogdanffy et al. | Oct. 6, 1953 |
| 2,715,308 | Soussloff et al. | Aug. 16, 1955 |

FOREIGN PATENTS

| | | |
|---|---|---|
| 563,746 | Germany | Nov. 9, 1932 |